United States Patent
Mochizuki

(10) Patent No.: US 11,082,698 B2
(45) Date of Patent: Aug. 3, 2021

(54) IMAGE CAPTURING APPARATUS HAVING A FUNCTION FOR ENCODING RAW IMAGE CONTROL METHOD THEROF, AND NON-TRANSITORY COMPUTER-READABLE STORAGE MEDIUM

(71) Applicant: CANON KABUSHIKI KAISHA, Tokyo (JP)

(72) Inventor: Shigeki Mochizuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/709,697

(22) Filed: Dec. 10, 2019

(65) Prior Publication Data
US 2020/0195931 A1    Jun. 18, 2020

(30) Foreign Application Priority Data
Dec. 14, 2018   (JP) .............................. JP2018-234707

(51) Int. Cl.
| | |
|---|---|
| *H04N 19/136* | (2014.01) |
| *H04N 19/126* | (2014.01) |
| *H04N 19/115* | (2014.01) |
| *H04N 5/232* | (2006.01) |

(52) U.S. Cl.
CPC ..... *H04N 19/136* (2014.11); *H04N 5/232939* (2018.08); *H04N 19/115* (2014.11); *H04N 19/126* (2014.11)

(58) Field of Classification Search
CPC .. H04N 19/136; H04N 19/126; H04N 19/115; H04N 5/232939; H04N 19/186; H04N 19/15; H04N 19/154; H04N 19/63
See application file for complete search history.

(56) References Cited

U.S. PATENT DOCUMENTS

| | | | | |
|---|---|---|---|---|
| 2012/0308145 A1* | 12/2012 | Kim | ...................... | G06T 7/0002 382/219 |
| 2014/0098268 A1* | 4/2014 | Mochizuki | ........... | H04N 9/0451 348/277 |
| 2017/0118476 A1* | 4/2017 | Sakamoto | ............... | G06T 5/002 |
| 2017/0359579 A1* | 12/2017 | Miyauchi | ............. | H04N 19/124 |

FOREIGN PATENT DOCUMENTS

| | | |
|---|---|---|
| JP | H11-261740 A | 9/1999 |
| JP | 2005-159419 A | 6/2005 |

* cited by examiner

*Primary Examiner* — Gevell V Selby

(74) *Attorney, Agent, or Firm* — Cowan, Liebowitz & Latman, P.C.

(57) ABSTRACT

This invention provides an apparatus having an image capturing unit, a transforming unit which transforms RAW image obtained by the image capturing unit into a plurality of channels, and an encoder which performs a frequency transformation, quantization, and encoding for each channel, where the apparatus comprises a classifying unit which, based on a sub-band of a low-frequency component obtained by the frequency transformation for a channel, in which a luminance component is predominant, obtained by the transforming unit, classifies a luminance of each region in a case where one screen is divided into a plurality of regions; and an estimation unit which, for each luminance, computes an index value representing a degree of difference between data before/after the quantization for each region, and estimates an image quality based on the index value.

18 Claims, 16 Drawing Sheets

FIG. 7A
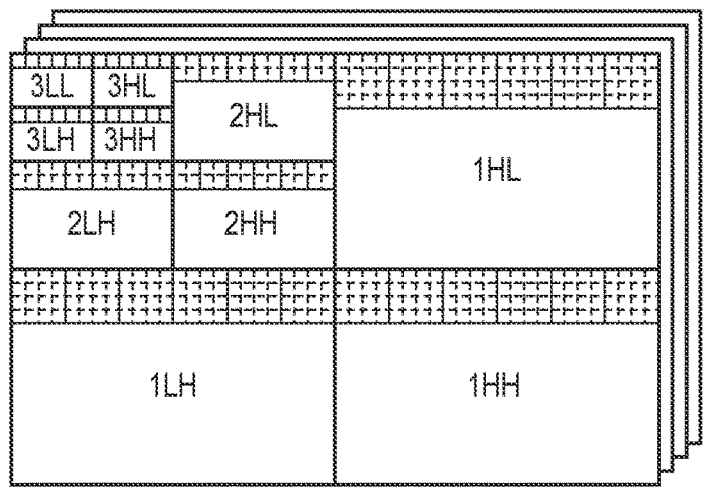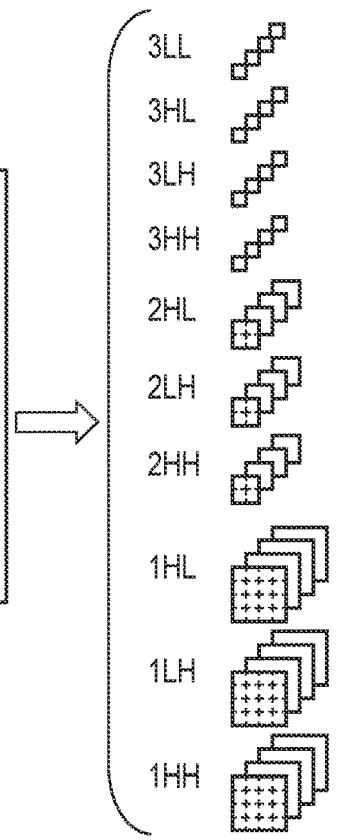
FIG. 7B
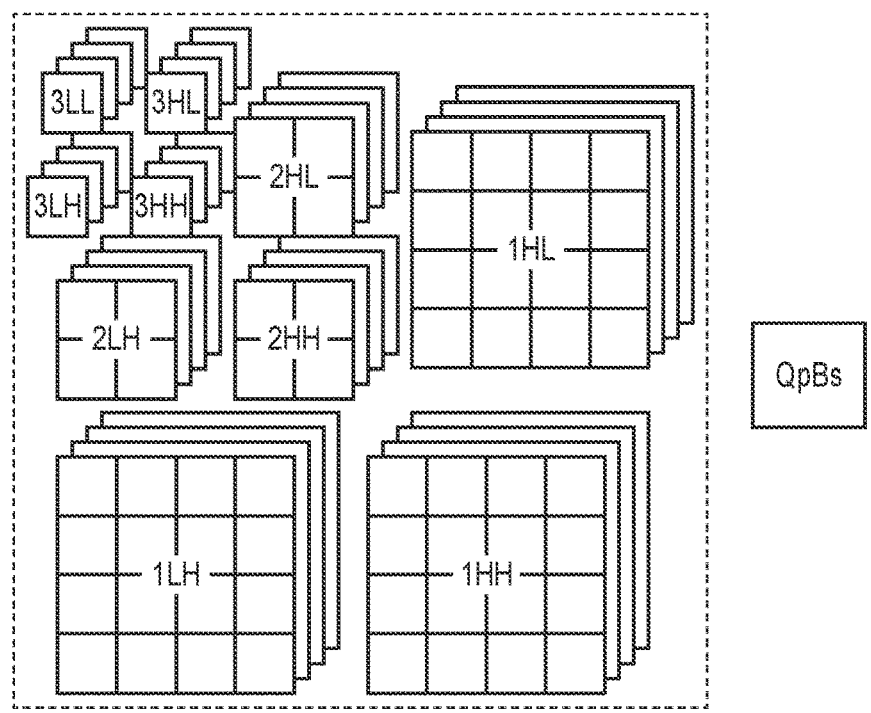

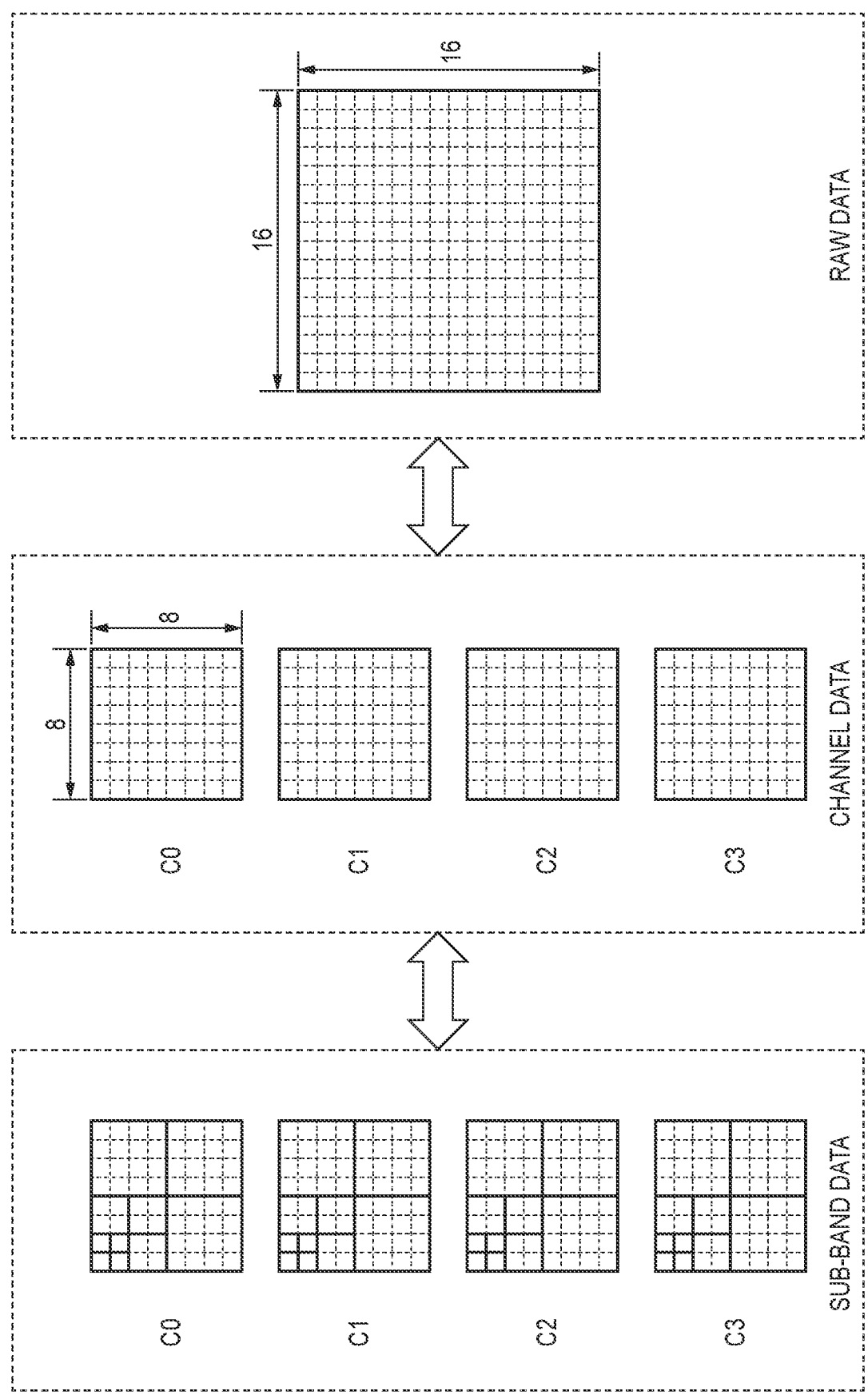

FIG. 10A

| main_header ( ) { | |
|---|---|
| coded_data_size | u (32) |
| width | u (32) |
| height | u (32) |
| depth | u (8) |
| channel | u (8) |
| type | u (8) |
| lev | u (8) |
| } | |

※ u (8)  : unsigned integer  8 bits
※ u (32) : unsigned integer 32 bits

FIG. 10B

| tile_header ( ) { | |
|---|---|
| tile_index | u (32) |
| tile_data_size | u (32) |
| tile_width | u (32) |
| tile_height | u (32) |
| } | |

※ u (32) : unsigned integer 32 bits

FIG. 10C

| qp_header ( ) { | |
|---|---|
| qp_data_size | u (32) |
| qp_width | u (32) |
| qp_height | u (32) |
| } | |

※ u (32) : unsigned integer 32 bits

FIG. 10D

| channel_header ( ) { | |
|---|---|
| channel_index | u (32) |
| channel_data_size | u (32) |
| } | |

※ u (32) : unsigned integer 32 bits

FIG. 10E

| sb_header ( ) { | |
|---|---|
| sb_index | u (32) |
| sb_data_size | u (32) |
| sb_qp_a | u (16) |
| sb_qp_b | u (16) |
| } | |

※ u (16) : unsigned integer 16 bits
※ u (32) : unsigned integer 32 bits

IMAGE CAPTURING APPARATUS HAVING A FUNCTION FOR ENCODING RAW IMAGE CONTROL METHOD THEROF, AND NON-TRANSITORY COMPUTER-READABLE STORAGE MEDIUM

BACKGROUND OF THE INVENTION

Field of the Invention

The present invention relates to an image capturing apparatus, a control method thereof, and a non-transitory computer-readable storage medium.

Description of the Related Art

Recent digital cameras, CCDs and CMOS image sensors are often employed as image capturing elements, and in single plate type image capturing elements, green (G), blue (B), and red (R) pixel data (hereinafter referred to as RAW data) are obtained by light passing through color filters arranged in a Bayer array as illustrated in FIG. 2. FIG. 2 illustrates an example of a Bayer array, which is configured by periodic patterns of R (red), G1 (green), G2 (green), and B (blue). Since human visual sensitivity is more sensitive to brightness components (luminance components) than to color components, green, which contains more brightness components, is assigned twice as much area as red or blue. As described above, in the RAW data of the Bayer array, there is information of only one color component per pixel. Since one pixel of a color image is usually composed of three color components of green, blue, and red, the remaining two components are derived from the surrounding pixel values. The process of generating in this manner image data of the three components of one pixel from the image of the Bayer array (one component for one pixel) is called a demosaicing process.

In digital cameras, starting with the demosaicing processing, development processing such as noise removal processing, optical distortion correction, and color correction processing is performed, and final image data is generated, and then image data compressed by an encoding method as typified by JPEG in the case of a still image, H.264 in the case of a moving image, or the like is recorded. Meanwhile, a function of recording the RAW data before the development processing so that the development processing can be executed according to the preferences of the user himself/herself has also been implemented. As the recording format of the RAW data, non-compression or a lossless compression format are often employed, and the size of the RAW data to be recorded is generally larger than that of the compressed image data after development. Therefore, it has become important to compress the RAW data and to record it in a compact manner as the density and pixels of image capturing elements increases and higher resolutions are implemented.

However, since it is necessary to consider that various processes are performed in accordance with user needs in the development process, in the case where lossless compression is applied in order to ensure the image quality, the RAW data is often handled at a low compression rate that assumes a worst case with lossy compression.

Therefore, a method for estimating the effect of deterioration due to compression is also important, and for example, a technique for estimating image quality in consideration of human visual characteristics (Japanese Patent Laid-Open No. H11-261740), a technique for estimating image quality in consideration of block distortion (Japanese Patent Laid-Open No. 2005-159419), and the like have been proposed.

In general, since quantization processing is used for compression and division is performed in accordance with predetermined quantization steps, it is considered that the smaller the signal level before quantization, the easier it is to lose information with respect to the original data.

However, in the case of RAW data, it is envisioned that emphasis processing such as offset and gain increase will performed as with exposure correction and color correction in development processing. Therefore, it is considered that a signal having a lower luminance in RAW data is more susceptible to information loss due to quantization, that is, is susceptible to visual image quality deterioration, and therefore, an image quality estimation method considering luminance is desired.

SUMMARY OF THE INVENTION

It is an object of the present invention to provide a technique for assisting recording of RAW image data according to an image quality and compression rate permitted by a user by performing an estimation in consideration of an influence of post-development deterioration due to compression of the RAW image data.

According to an aspect of the present invention, there is provided an image capturing apparatus having an image capturing unit, a transforming unit configured to transform RAW image data obtained by the image capturing unit into a plurality of channels, and an encoding unit configured to perform a frequency transformation, quantization, and encoding for each channel, the image capturing apparatus comprising: a classifying unit configured to, based on a sub-band of a low-frequency component obtained by the frequency transformation for a channel, in which a luminance component is predominant, obtained by the transforming unit, classify a luminance of each region in a case where one screen is divided into a plurality of regions; and an estimation unit configured to, for each luminance, compute an index value representing a degree of difference between data before/after the quantization for each region, and estimate an image quality based on the index value.

According to the present invention, by estimating RAW image data in consideration of the effect of deterioration after development due to compression, it is possible to support recording of RAW image data with an image quality and compression rate permitted by a user.

Further features of the present invention will become apparent from the following description of exemplary embodiments (with reference to the attached drawings).

BRIEF DESCRIPTION OF THE DRAWINGS

FIGS. 7A and 7B are diagrams illustrating examples of quantization control units related to feedforward control.

FIG. 8 is a diagram illustrating a relationship between quantization control units and RAW data.

FIGS. 10A to 10E illustrate examples of syntax elements of header information.

DESCRIPTION OF THE EMBODIMENTS

Hereinafter, embodiments according to the present invention will be explained in detail in accordance with the accompanying drawings. It should be noted that the configuration in the following embodiments is merely an example, and the present invention is not limited to the illustrated configuration.

First Embodiment

Figure 1:
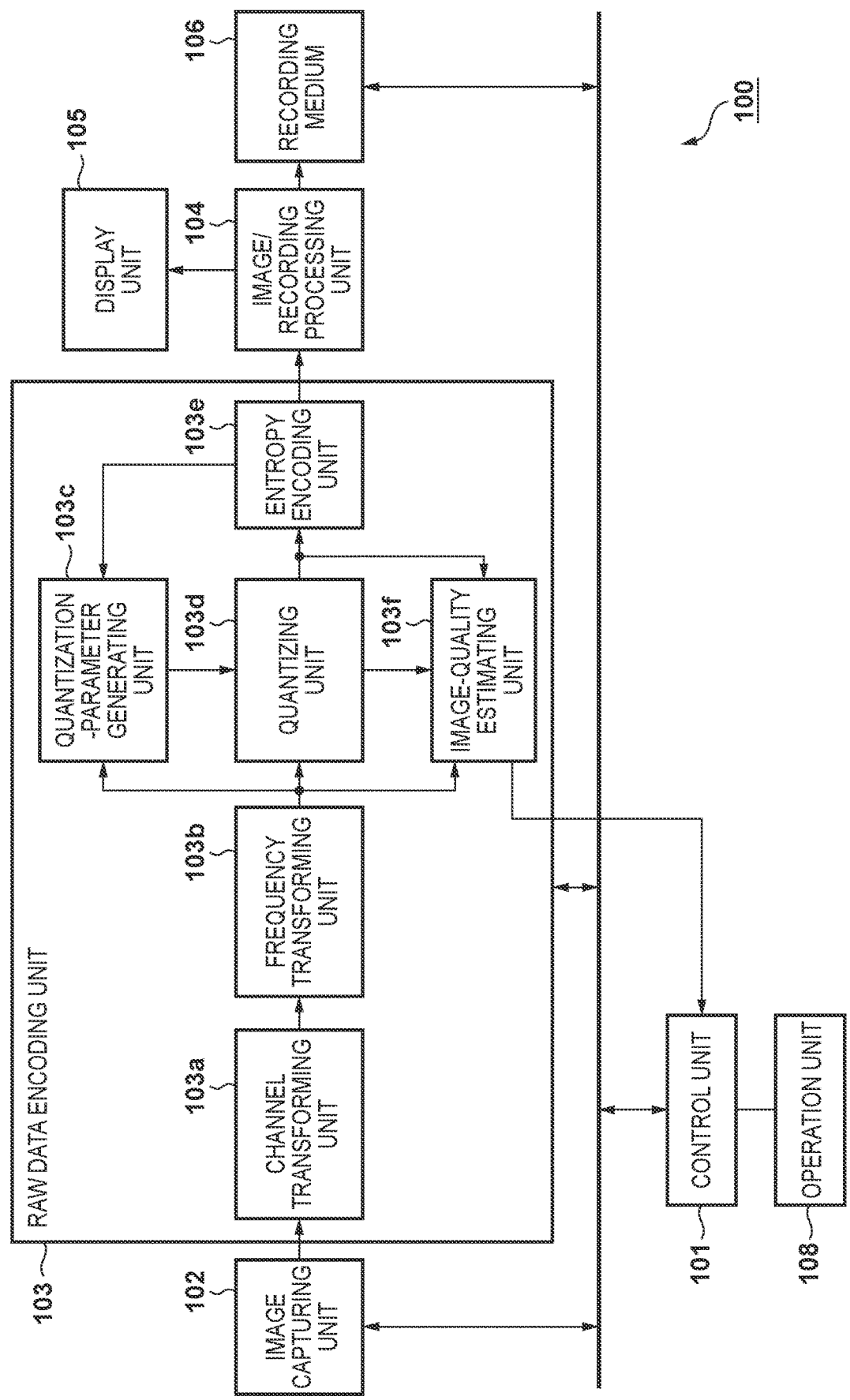
FIG. 1 is a block diagram illustrating a configuration of an image capturing apparatus which is an embodiment.

Configurations and processing flows of the image capturing apparatus 100 according to a first embodiment will be described with reference to the block diagram illustrated in FIG. 1.

A control unit 101 controls each processing unit comprised in an image capturing apparatus 100, and comprises a CPU, a ROM for storing programs to be executed by the CPU and various data, and a RAM used as a work area or the like. The control unit 101 reads a program stored in the ROM and executes the program, thereby executing various calculations, various processes, control of respective units, and the like.

Figure 2:
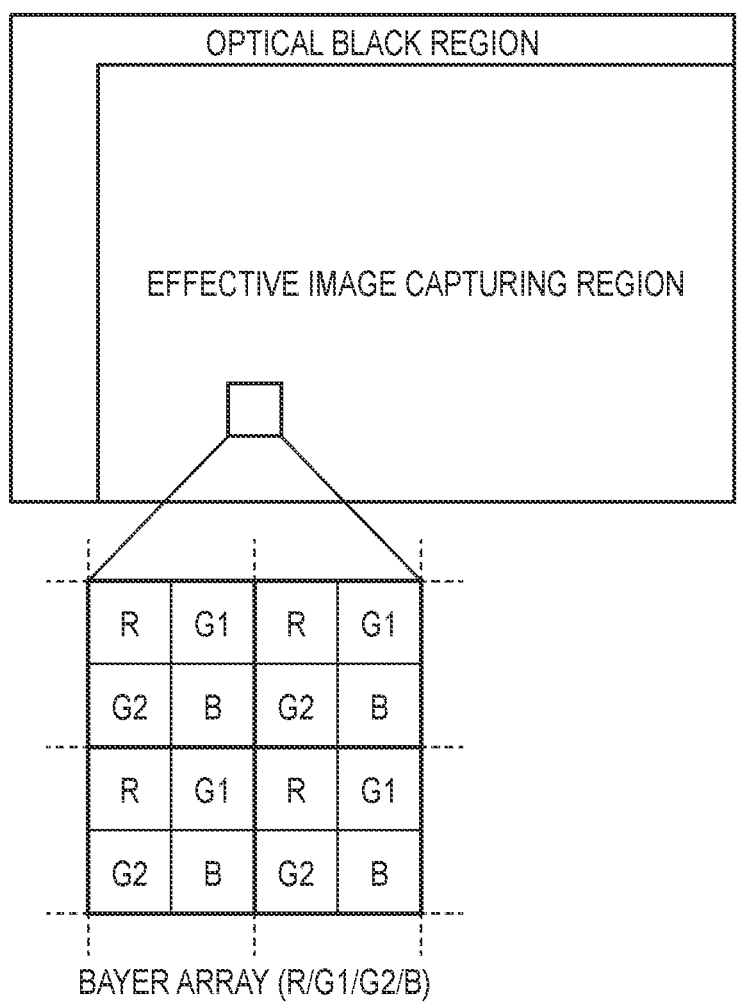
FIG. 2 illustrates RAW data of a Bayer array.

An image capturing unit 102 includes a lens optical system capable of optical zooming including an optical lens, an aperture, a focusing control, and a lens driving unit, and an image capturing element such as a CCD image sensor or a CMOS sensor for converting optical information from the lens optical system into electric signals. The image capturing unit 102 converts an electric signal obtained by the image capturing element into a digital signal, and outputs the obtained RAW data to the RAW data encoding unit 103. As illustrated in FIG. 2, the RAW data is configured by an effective image capturing region, which is a pixel region in which light is received, and an optical black region, which is a pixel region that has been blocked from light. Incidentally, RAW data is configured by four color elements of R (red), G1 (green), G2 (green), and B (blue) in a Bayer array, but the array and the color elements are not limited to this configuration, and other methods may be used.

A RAW data encoding unit 103 performs various processes on the RAW data inputted from the image capturing unit 102, encodes the RAW data, and outputs the generated encoded data to an image recording processing unit 104. Detailed configuration and operation of the RAW data encoding unit 103 will be described later. In the present embodiment, in order to reduce the data amount of RAW data, the RAW data encoding unit 103 performs compression encoding on RAW data in accordance with a set compression rate.

The image recording processing unit 104 performs predetermined recording formatting on inputted encoded data and records the result in a recording medium 106. In addition, the image recording processing unit 104 executes a restoration process of decoding encoded data read from the recording medium 106 and restoring the RAW data. In addition, image data generated by development processing such as demosaicing processing, noise removal processing, optical distortion correction processing, and color correction processing with respect to RAW data restored by the restoration processing or RAW data acquired by the image capturing unit 102 is output to a display unit 105. The various processes performed by the image recording processing unit 104 are controlled by the control unit 101.

The display unit 105 is a display comprising, for example, a liquid crystal panel or an organic EL panel for displaying inputted image data. Note that display processing by the display unit 105 is controlled by the control unit 101. When outputting the image data to the display unit 105, the control unit 101 not only outputs the image data to the display unit 105 but also performs a process of superimposing various information, icons indicating information, and the like on the image data and outputting the image data to the display unit 105.

The recording medium 106 is a recording medium comprising, for example, a nonvolatile memory. Typically, the recording medium 106 is a detachable memory card. Instead of a small detachable recording medium such as a memory card, an external recording device may be connected, and encoded data from the image recording processing unit 104 may be recorded in the external recording device.

An operation unit 108 comprises various switches, buttons, a touch panel, and the like, and is used to transmit an instruction from a user to the image capturing apparatus. The control unit 101 performs various processes and controls in accordance with an instruction from the user via the operation unit 108. The user can input an instruction to start recording of RAW data through the operation unit 108.

When standing by for image capturing prior to receiving an instruction to start recording via the operation unit 108, the control unit 101 displays a live image by executing various processes by the image recording processing unit 104 on RAW data captured by the image capturing unit 102 and displaying the RAW data on the display unit 105. The user can adjust a capture timing (a timing at which a record instruction is inputted) while confirming a subject in the live image displayed on the display unit 105.

When an instruction to start recording is received via the operation unit 108, the control unit 101 generates encoded data by performing compression coding processing on RAW data captured by the image capturing unit 102 by the RAW data encoding unit 103, and records the compression-encoded RAW data on the recording medium 106 by the image recording processing unit 104.

A rough configuration of the image capturing apparatus 100 according to the embodiment has been described above. Next, a detailed configuration and a processing flow of the RAW data encoding unit 103 will be described with reference to the block diagram illustrated in FIG. 1.

The RAW data encoding unit 103 mainly includes a channel transforming unit 103a, a frequency transforming unit 103b, a quantization-parameter generating unit 103c, a quantizing unit 103d, an entropy encoding unit 103e, and an image-quality estimating unit 103f.

Figure 3A:
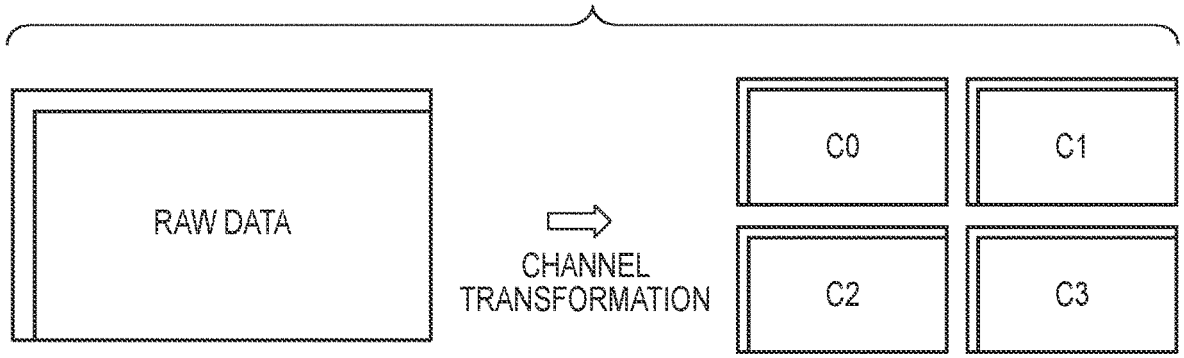
FIGS. 3A to 3C are diagrams illustrating examples of channel transformations.
Figure 3B:
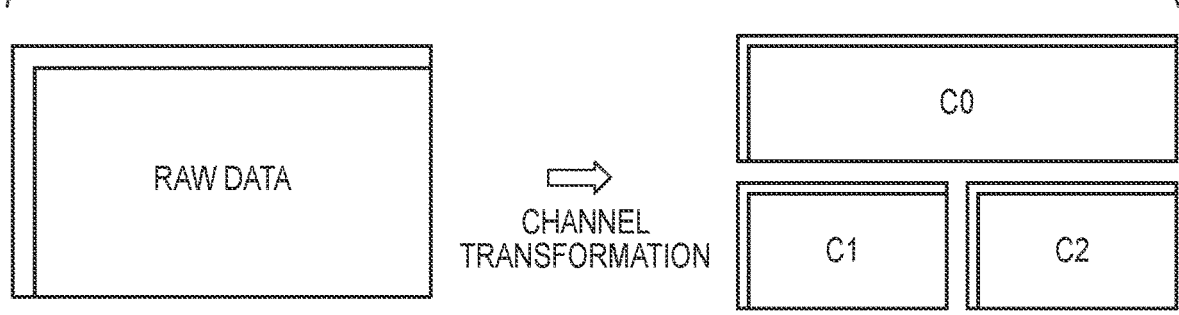
Figure 3C:
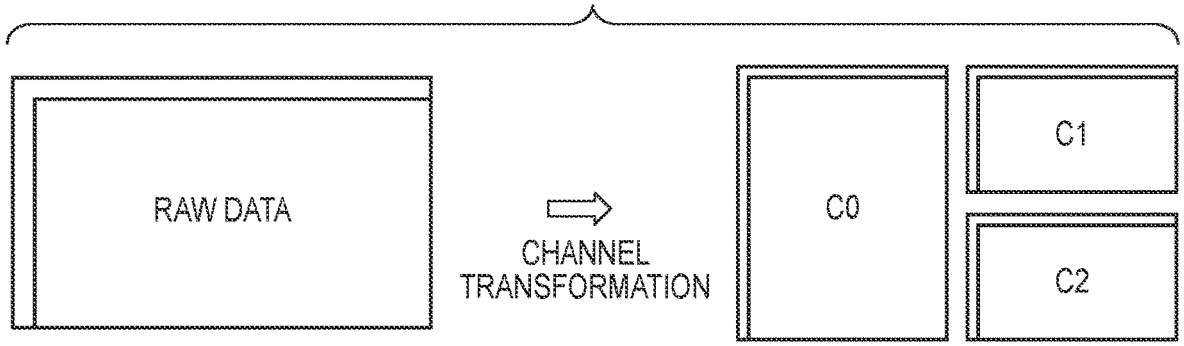

The channel transforming unit 103a transforms inputted RAW data of the Bayer array into a plurality of channels as illustrated in FIGS. 3A to 3C. For example, a transformation from the RAW data of the Bayer array into the four channels of an R component-only plane (R channel), a G1 component-only plane (G1 channel), a G2 component-only plane (G2 channel), and a B component-only plane (B channel) is performed. The channel transforming unit 103a transforms, for example, R, G1, G2, and B into four-channel data of C0 to C3 according to the following Equations (1).

$$C0 = a + c$$

$$C1 = B - G2$$

$$C2 = R - G1$$

$$C3 = b - a \qquad (1)$$

where $a = G2 + \text{floor}(C1/2)$, $b = G1 + \text{floor}(C2/2)$, $c = \text{floor}(C3/2)$ and where floor(x) is a floor function that returns a largest integer for the real number x.

Here, C0 represents a channel corresponding to brightness, and C1 to C3 represent channels corresponding to color differences.

It should be noted that although an exemplary configuration for transformation into four channels as illustrated in FIG. 3A is given here, transformation into three channels for each of R, G, into which G1, and G2 are combined, and B, as illustrated in FIG. 3B and FIG. 3C may be used, and the number of channels and the transformation method are not limited to the above-described method. In short, it is only necessary to able to restore the image of the original Bayer array from the data transformed into a plurality of channels.

The frequency transforming unit 103b performs discrete wavelet transformation (a frequency transformation process) up to a predetermined decomposition level (hereinafter referred to as lev) on a channel-by-channel basis, and outputs generated sub-band data (transform coefficients) to the quantization-parameter generating unit 103c, the quantizing unit 103d, and the image-quality estimating unit 103f.

Figure 4A:
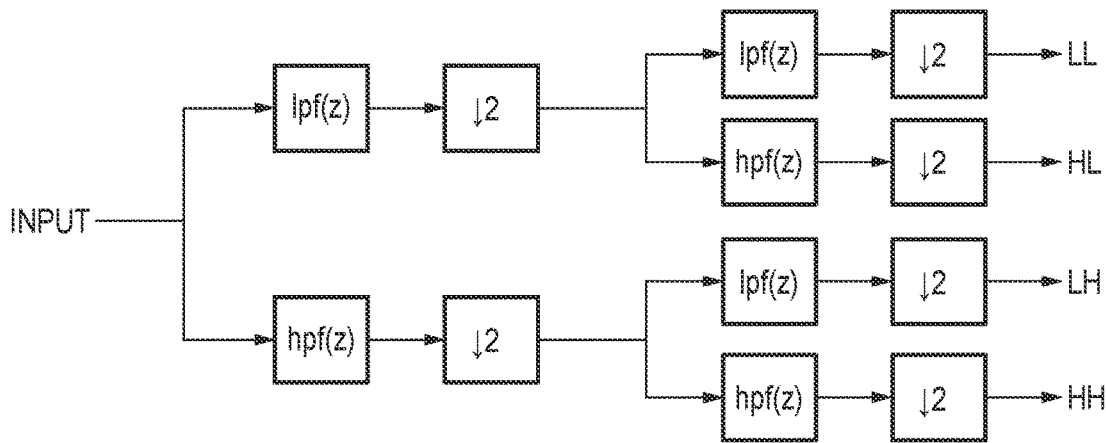
FIGS. 4A to 4C are diagrams illustrating examples of frequency transformation (sub-band division).
Figure 4B:
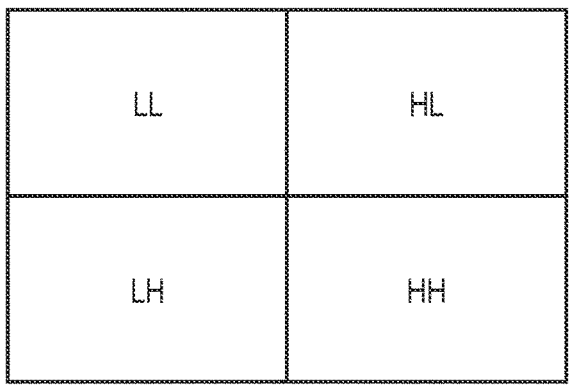

FIG. 4A illustrates a filter bank configuration for realizing a discrete wavelet transform related to a sub-band division process of lev=1. When the discrete wavelet transform process is performed horizontally and vertically, one low frequency sub-band {LL} and three high frequency sub-bands {HL, LH, HH} are obtained as illustrated in FIG. 4B. Transfer functions of a low-pass filter (hereinafter referred to as lpf) and a high-pass filter (hereinafter referred to as hpf) illustrated in FIG. 4A are as illustrated in the following Equations (2) and (3).

$$\text{lpf}(z) = (-z^{-2} + 2z^{-1} + 6 + 2z^{1} - z^{2})/8 \qquad (2)$$

$$\text{hpf}(z) = (-z^{-1} + 2 - z^{1})/2 \qquad (3)$$

Figure 4C:
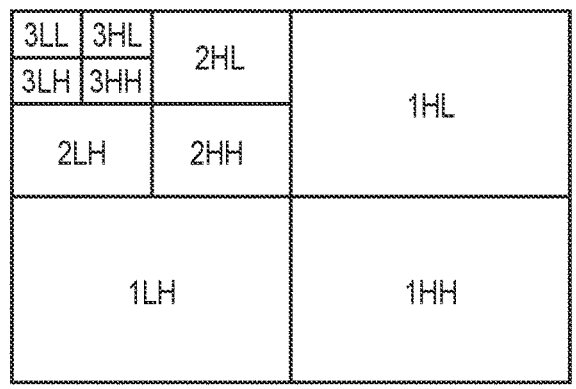

In FIG. 4A, "↓2" represents 2:1 downsampling. Thus, since downsampling is performed once in each of the horizontal and vertical directions, the size of the individual sub-bands obtained in a single wavelet transform is ¼ of the original size. In order to obtain a sub-band having a decomposition level exceeding the decomposition level 1, discrete wavelet transformation may be recursively performed on the sub-band {LL} obtained at the immediately preceding decomposition level. For example, when lev=3, one plane to be transformed is divided into 10 sub-bands as illustrated in FIG. 4C. Here, the discrete wavelet transform is configured by a 5-tap lpf and a 3-tap hpf as illustrated in the above Equations (1) and (2), but may be configured by filters of a different number of taps and different coefficients.

In order to perform quantization processing on the sub-band data (transform coefficients) generated by the frequency transforming unit 103b, the quantization-parameter generating unit 103c performs quantization parameter generation processing related to code amount control on a predetermined sub-band data unit basis based on a target code amount computed from a compression rate set in advance, and firstly generates a first quantization parameter common to all channels and all sub-bands.

Figure 6:
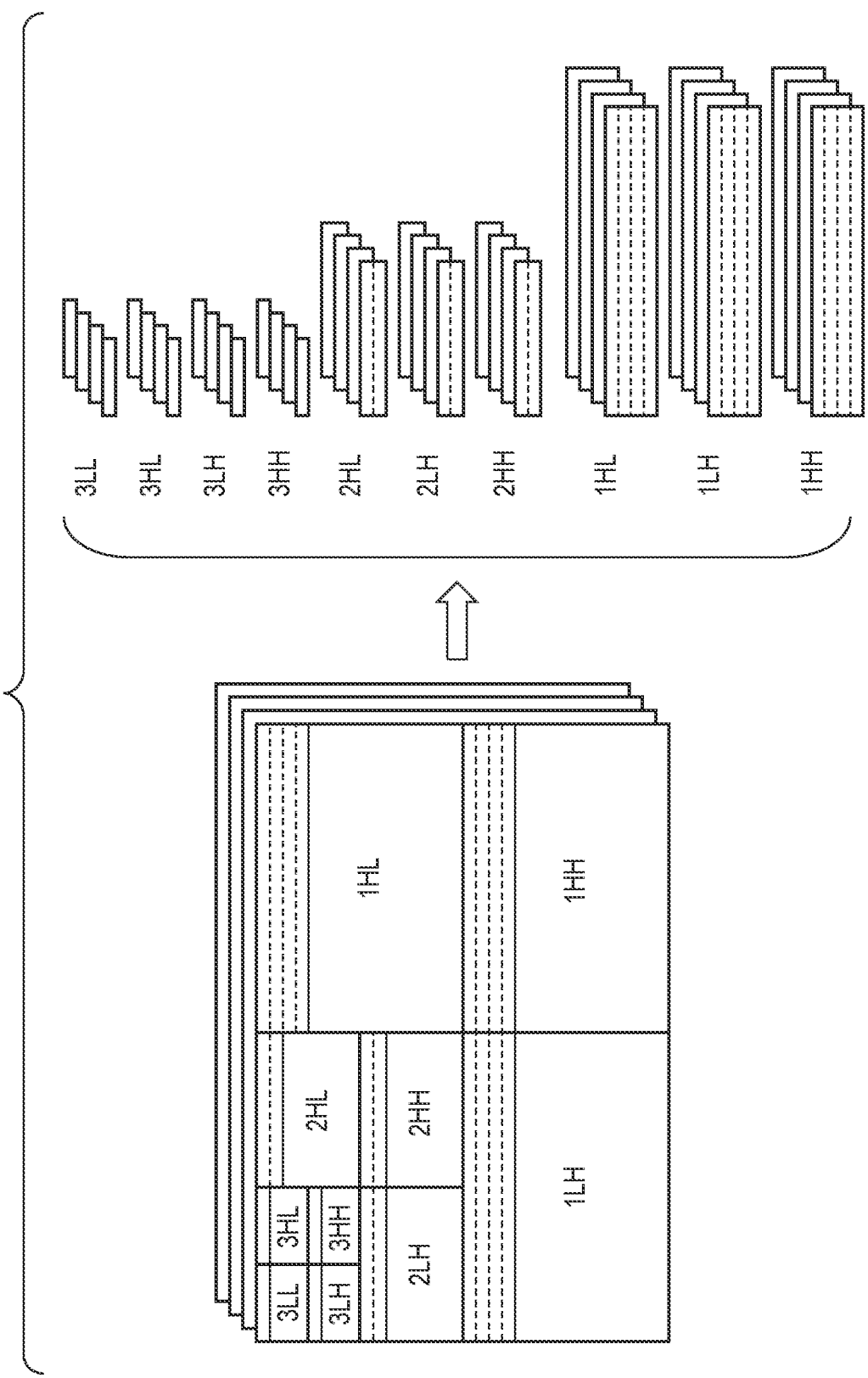
FIG. 6 is a diagram illustrating an example of a quantization control units related to code amount control.

FIG. 6 illustrates units for quantization parameter updating and code amount estimation for code amount control in a case where each channel is sub-band-divided at lev=3. Sub-band data for N (N is an integer) lines in the vertical direction for the sub-bands {3LL, 3HL, 3LH, 3HH} of level 3 of all channels C0 to C3 (in this embodiment, 4 channels), 2×N lines in the vertical direction for the sub-bands {2HL, 2LH, 2HH} of level 2, and 4×N lines in the vertical direction for the sub-bands {1HL, 1LH, 1HH} of level 1 are collectively used as one processing unit.

Those skilled in the art will readily appreciate that the coefficients of each sub-band illustrated on the right side of FIG. 6 represent the coefficients of the same region in the image to be encoded. Hereinafter, the set of coefficients illustrated on the right side of FIG. 6 is referred to as a "band" (note that the set is not to be confused with a sub-band).

The quantization-parameter generating unit 203 compares a target code amount corresponding to a band with a generated code amount, and repeats feedback control so as to bring the generated code amount of the next band closer to a target generated code amount, thereby generating a quantization parameter (QpBr) that is shared by all channels and all sub-bands. That is, when the number of bands is Bn, QpBr(0), QpBr(1), QpBr(2), ..., QpBr(Bn−1) are obtained. When in-screen code amount control is not performed on RAW data, a QpBr that is shared by all the channels and all the sub-bands to be fixed for the entire screen may be set or generated regardless of the code amount control units described above.

The quantization-parameter generating unit 103c according to the embodiment executes the control of the code amount of the encoding of the next band according to the following equation each time the encoding process for each band is performed.

$$QpBr(i) = QpBr(0) + r \times \Sigma\{S(i-1) - T(i-1)\}$$

QpBr(0): Initial quantization parameter of the first band
QpBr(i): Quantization parameter for the i-th band (i>0)
r: Control sensitivity
S(i): Code amount of encoded data generated in the i-th band
T(i): Target code amount of the i-th band When the number of bands included in one frame is Bn, and the target code amount of one frame is T, T(i)=T/Bn. In the present embodiment, the i-th target code amount T(i) is set to T(i)=T/Bn, but the target code amount may be set differently.

In the above equation, the initial quantization parameter QpBr(0) set for the leading band is used as a reference, and the quantization parameter QpBr(i) of the i-th band is adjusted in accordance with the magnitude of the difference between the generated code amount and the target code amounts for up to the i−1-th band which is the immediately preceding band. More specifically, the quantization parameter QpBr(i) of the band to be processed is determined by adjusting the value of the initial quantization parameter so that a code amount difference between the total of the code amounts generated after the leading band (total generated code amount) and the total of the corresponding target code amounts (total target code amount) becomes small. After the quantization parameter QpBr is generated for each band in this manner, the quantization-parameter generating unit 103c further divides (segments) the band and generates the quantization parameter QpBs for each segment, which is a second unit of processing.

FIG. 7A illustrates second units processing (segments) for quantization parameter updating and sub-band data estimation for image quality control in a case where each channel is sub-band-divided at lev=3. M×N (M and N are integers) is used for the horizontal and vertical directions for the sub-bands {3LL, 3HL, 3LH, 3HH} of level 3 of all channels, (2×M)×(2×N) is used for the horizontal and vertical directions for the sub-bands {2HL, 2LH, 2HH} of level 2, and (4×M)×(4×N) is used for the horizontal and vertical directions for the sub-bands {1HL, 1LH, 1HH} of level 1 for each segment.

The segments illustrated here as the second units of processing are obtained by dividing the bands which are the first units of processing in the horizontal direction. In the present embodiment, segmentation is performed so that the number of segments included in each sub-band is the same. When M=1 and N=1, segments correspond to level 1, and are what results from dividing the bands into four pixel coefficients in the horizontal direction. The quantization-parameter generating unit 103c generates a quantization parameter for each segment by modifying the quantization parameter QpBr computed for each band in accordance with the image quality properties for each segment.

Let QpBr(p) be the quantization parameter of the p-th band and QpBs(p, q) be the quantization parameter of the q-th segment in the p-th band. If one band includes Q segments, the quantization-parameter generating unit 103c calculates QpBs(p, 0), QpBs(p, 1), ..., QpBs(p, Q−1). The quantization-parameter generating unit 103c uses the quantization parameter QpBr(p) of the p-th band as the quantization parameter value QpBs(p, 0) of the first segment in the p-th band. The q-th (q≥1) segment is determined by estimating the 3LL sub-band data of the immediately preceding q−1-th segment as a low-frequency component to obtain an offset value (a positive or negative value can be obtained) and adding the offset value to the quantization parameter QpBs(p, q−1) used in the immediately preceding segment.

As described above, the obtained all-band, all-segment quantization parameters QpBs(0, 0), QpBs(0, 1), ..., QpBs(Bn−1, Q−1) are first quantization parameters. Here, when M=N=1, the area covered by one quantization parameter QpBs is 8×8 pixels for each channel as illustrated in FIG. 8, which corresponds to 16×16 pixels of the raw image data.

Next, the quantization-parameter generating unit 103c determines quantization parameters QpSb (second quantization parameters) unique to each channel and each sub-band to be used in the actual quantization process from the first quantization parameters QpBs obtained above according to the following Equation (4).

$$QpSb[i][j]=QpBs \times \alpha[i][j]+\beta[i][j] \quad (4)$$

α: Slope
β: Intercept
i: Channel index (0-3)
j: Sub-band index (0-9)

Here, the slope α and the intercept β in Equation (4) are variables for each individual channel and sub-band, and it is possible to flexibly perform quantization control for each channel and each sub-band by the weighting coefficients α and β for each individual channel and sub-band. In addition, for each sub-band, the values of α and β are reduced in order to reduce the value of the quantization parameter the more of a low frequency component the sub-band is, and the values of α and β are increased in order to increase the value of the quantization parameter the more of a high frequency component the sub-band is.

The quantization-parameter generating unit 103c supplies the foregoing second quantization parameter to the quantizing unit 103d and the image-quality estimating unit 103f every time the encoding processing of the immediately preceding band is completed.

The quantizing unit 103d performs quantization processing on the sub-band data (transform coefficients) input from the frequency transforming unit 103b based on an individual quantization parameter (second quantization parameter) supplied from the quantization-parameter generating unit 103c, and outputs the quantized sub-band data (transform coefficients) to the entropy encoding unit 103e and the image-quality estimating unit 103f.

Figure 5:
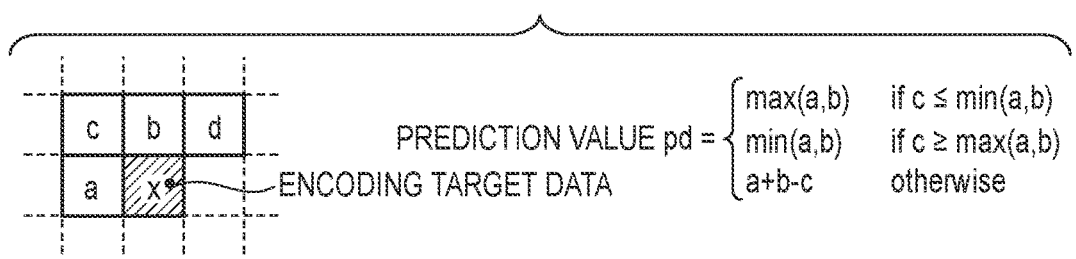
FIG. 5 is a diagram illustrating a prediction encoding method (MED prediction).

The entropy encoding unit 103e performs predictive differential entropy encoding on the quantized sub-band data (transform coefficients) inputted from the quantizing unit 103d and the first quantization parameter QpBs in raster scan order for each sub-band. Here, as illustrated in FIG. 5, the prediction value pd is generated from the peripheral data of encoding target data (transform coefficients) by MED (Median Edge Detector) prediction, and the difference data between the value of the encoding target data x and the prediction value pd is entropy encoded by, for example, Huffman coding, Golomb coding, or the like. The prediction method and the entropy encoding method may be other methods. Further, the generated code amount, which is generated in units of lines for each sub-band, is supplied to the quantization-parameter generating unit 103c.

The image-quality estimating unit 103f receives the sub-band data before quantization outputted from the frequency transforming unit 103b, the sub-band data after quantization outputted from the quantizing unit 103d, and the quantization parameter QpSb actually used. Then, the image-quality estimating unit 103f generates an estimation value for estimating the influence of encoding deterioration, and performs image quality estimation based on the estimation value. The corresponding image quality estimation method will be described later.

The configuration and processing contents of the RAW data encoding unit 103 according to the embodiment have been described above. The encoded data generated by the RAW data encoding unit 103 is multiplexed and recorded by the image recording processing unit 104 based on the data format illustrated in FIG. 9A.

Figure 9A:
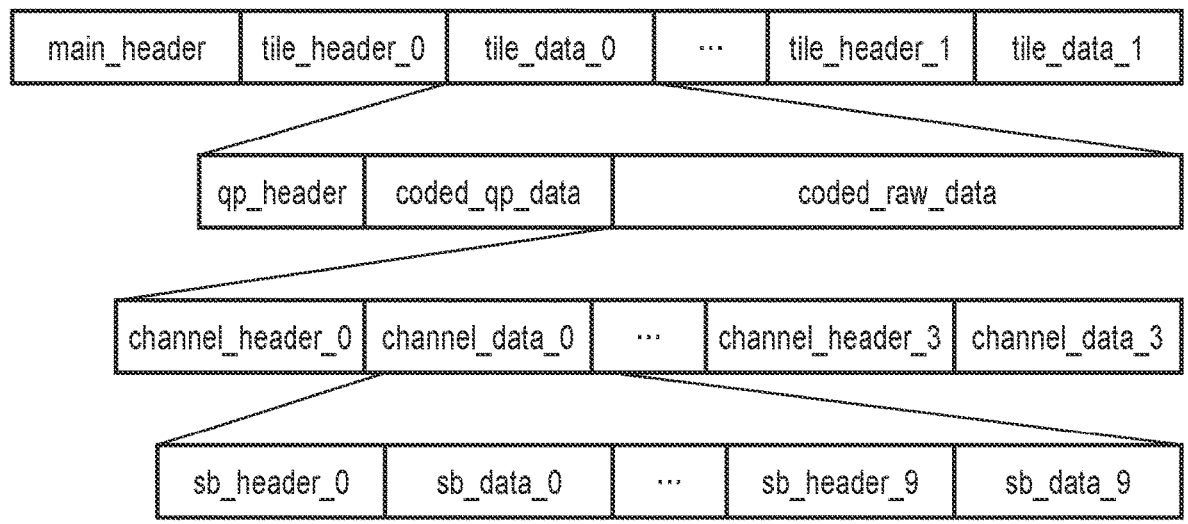
FIGS. 9A and 9B are diagrams illustrating examples of a recording format for encoded data.

The encoded RAW data format has a hierarchical structure as illustrated in FIG. 9A, starts with "main_header", which indicates information related to the entirety of the encoded data, and data can be stored in units of tiles by "tile_header" and "tile_data" assuming that the RAW data is divided into tiles and encoded in units of a plurality of pixel blocks. When tile division is not performed, there is only one "tile_header" and "tile_data".

Figure 9B:
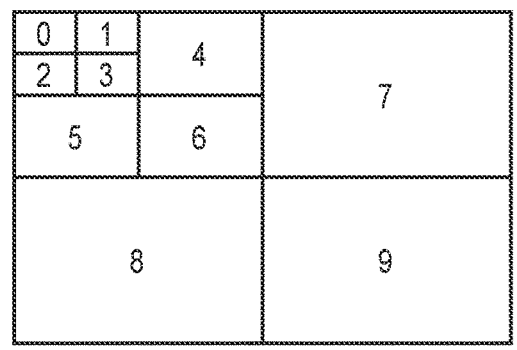

In the "tile_data", first, "qp_header" indicating information related to an encoding quantization parameter and "coded_qp_data" which is the encoding quantization parameter itself are arranged. The subsequent encoded RAW data "coded_raw_data" is arranged lined up in channel units, and data for a channel is stored in the order of "channel_header"

indicating information related to the respective channel and "channel_data" which is encoded data for the respective channel. The "channel_data" which is encoded data of a respective channel is configured by a set of encoded data for each sub-band, and "sb_header" which indicates information related to a respective sub-band and "sb_data" which is encoded data for the respective sub-band are arranged in order of sub-band index. The sub-band indices are as illustrated in FIG. 9B.

Next, syntax elements for respective header information will be described with reference to FIGS. 10A to 10E.

"main_header" is configured by "coded_data size" indicating the data amount of the entirety of the encoded RAW data, "width" indicating the width of the RAW data, "height" indicating the height of the RAW data, "depth" indicating the bit depth of the RAW data, "channels" indicating the number of channels at the time of encoding the RAW data, "type" indicating a channel transformation type, and "lev" indicating the sub-band decomposition level of the respective channel.

"tile_header" is configured by "tile_index" indicating an index of a tile for identifying a tile division position, "tile_data_size" indicating an amount of encoded data included in the tile, "tile_width" indicating a width of the tile, and "tile_height" indicating a height of the tile.

"qp_header" is configured by "qp_data_size" indicating the data amount of the encoding quantization parameter, "qp_width" indicating the width of the encoding quantization parameter, i.e., the number of quantization parameters in the horizontal direction corresponding to the RAW data, "qp_height" indicating the height of the encoding quantization parameter, i.e., the number of quantization parameters in the vertical direction corresponding to the RAW data.

The "channel_header" is configured by "channel_index" indicating an index of a channel for identifying a channel, and "channel_data_size" indicating an encoded data amount of the channel.

"sb_header" is configured by "sb_index" indicating a sub-band index for identifying a sub-band, "sb_data_size" indicating an encoded data amount of a sub-band, "sb_qp_a" indicating an $\alpha$ value in Equation (4) for generating a quantization parameter of each sub-band, and "sb_qp_b" indicating a $\beta$ value in Equation (4) for generating a quantization parameter of each sub-band.

Next, the image quality estimation method in the image-quality estimating unit 103f according to the embodiment will be described based on the flowchart illustrated in FIG. 11.

In step S1101, first, the image-quality estimating unit 103f classifies the luminance of each of a plurality of regions in one frame based on the lowest frequency sub-band among the sub-bands supplied from the frequency transforming unit 103b. To simplify the explanation, it is assumed that the image-quality estimating unit 103f classifies the luminance for each region corresponding to 16×16 pixels of the RAW data as illustrated in FIG. 8 by using 3LL sub-band data as illustrated in FIG. 7B. When the number of pixels in the horizontal direction of the RAW data is defined as W and the number of pixels in the vertical direction is defined as H, the number of regions is (W/16)×(H/16). A region corresponding to an i-th region in the horizontal direction and a j-th region in the vertical direction is denoted by R(i, j). Here, 0≤i≤(W/16−1) and 0≤j≤(H/16−1) are satisfied. In embodiments, one region R is of the same region size as the foregoing segment, but it is computationally convenient that it be an integer multiple of the size of a segment.

When the planes of the four channels generated by the channel transforming unit 103a are R, G1, G2, and B planes, the 3LL sub-band data for the G1 (or G2) channel including a large amount of brightness (or luminance) information may be used. When the channel transforming unit 103a performs channel transformation based on Equations (1), the 3LL sub-band data of the C0 channel, which is a signal corresponding to the brightness computed from an average value of R, G1, G2, and B, may be used.

Figure 11:
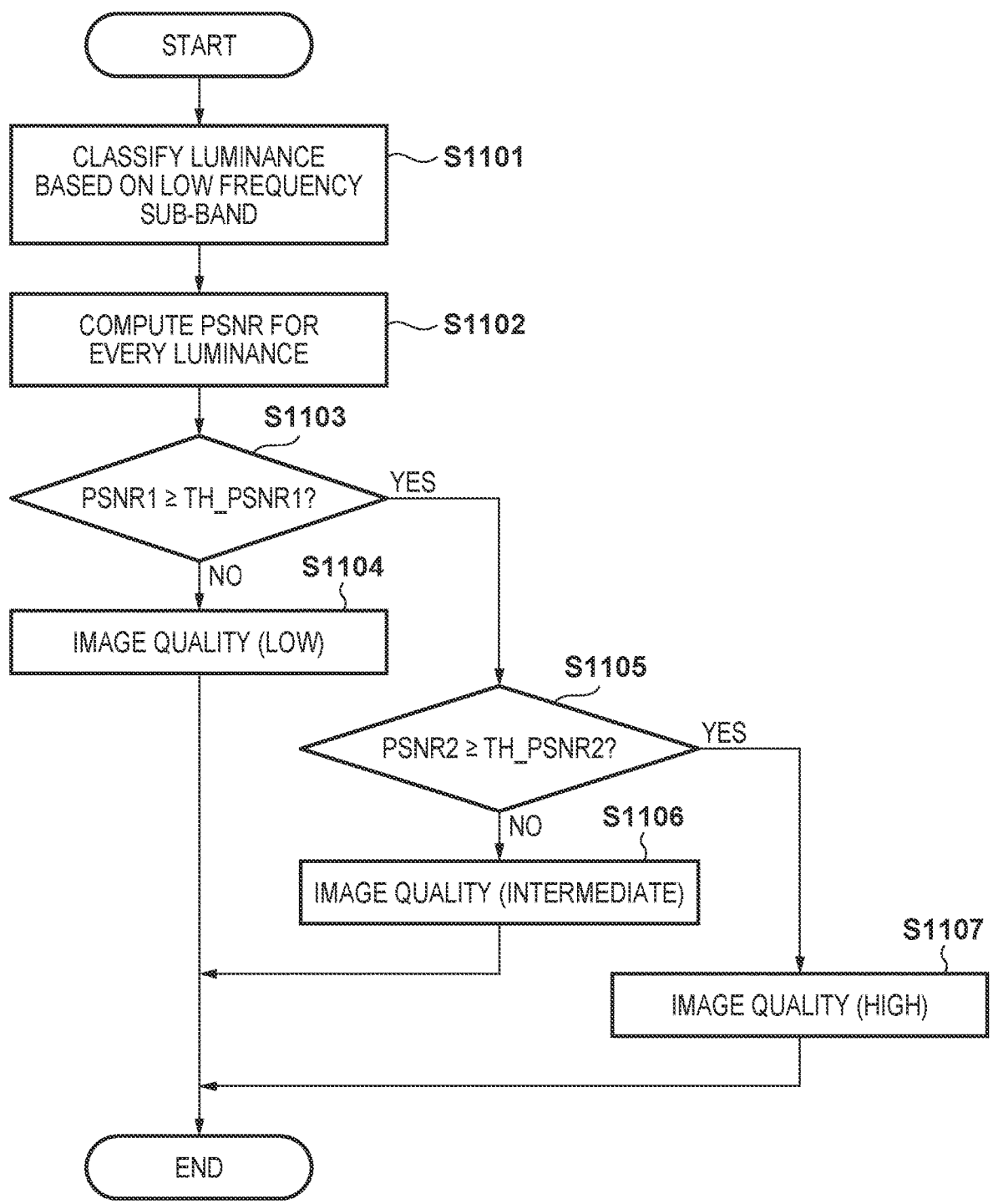
FIG. 11 is a flowchart illustrating an image quality estimation method according to the first embodiment.
Figure 12:
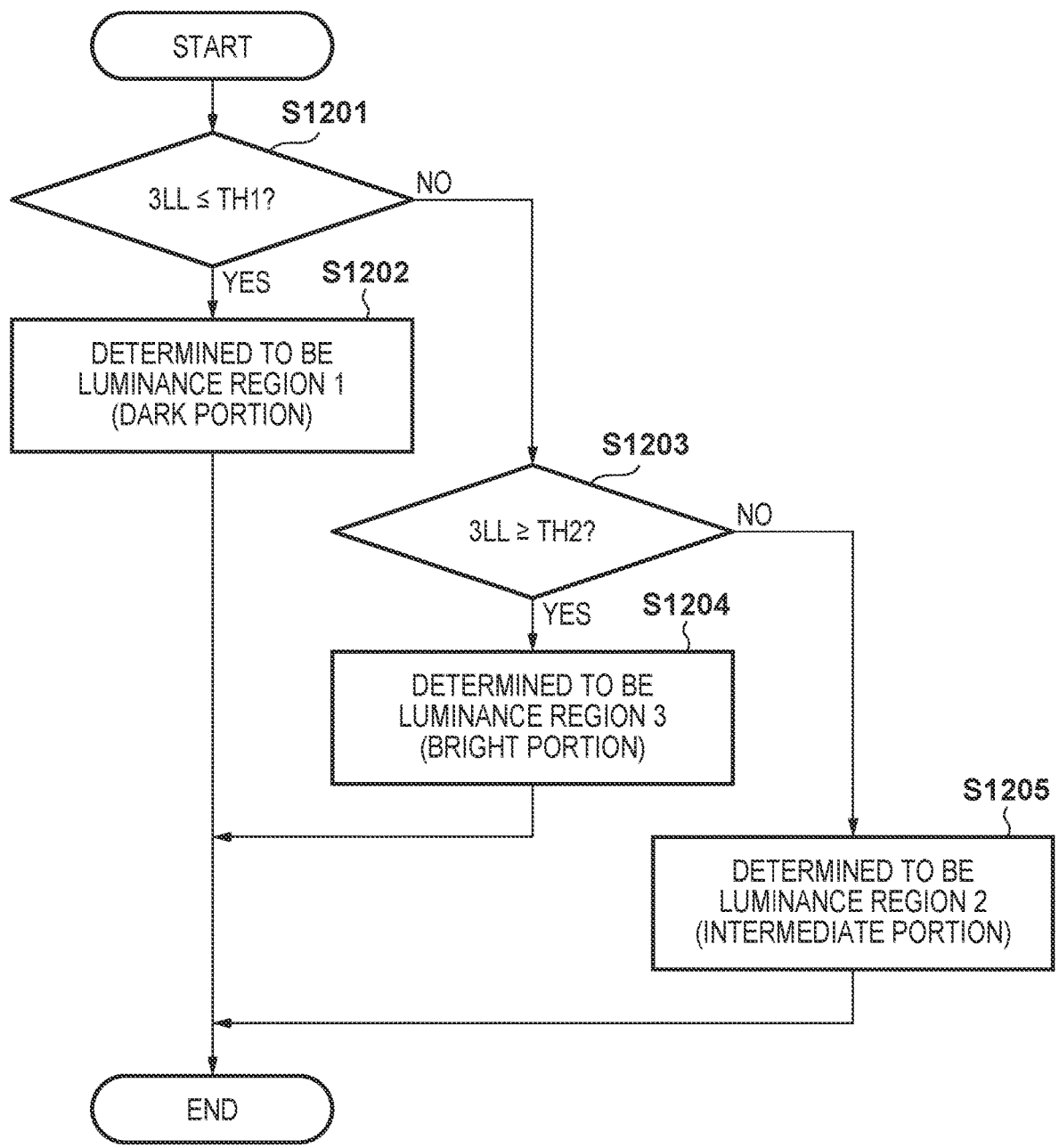
FIG. 12 is a flowchart illustrating a luminance classifying method.

The flowchart illustrated in FIG. 12 is a detailed example of the classification processing of step S1101 of FIG. 11. Hereinafter, luminance classification processing of the image-quality estimating unit 103f will be described in accordance with the same figure.

In step S1201, the image-quality estimating unit 103f compares a coefficient value of the sub-band LL (3LL since there are 3 wavelets levels in the embodiment) of the respective region R(,) against a threshold value TH1 for determining a dark portion, and performs a determination as to which is larger/smaller. Although the number of coefficients of the sub-band 3LL corresponding to one region is one in the case of the embodiment, when the number of coefficients is plural (when either of M or N is 2 or more), the average value is compared with the threshold value TH1 to determine which is larger/smaller.

When the 3LL coefficient is equal to or smaller than the threshold value TH1, the image-quality estimating unit 103f determines that the region R(,) belongs to luminance region 1 (dark portion) in step S1202.

When it is determined in step S1201 that the 3LL coefficient value is larger than the threshold value TH1, the image-quality estimating unit 103f advances the process to step S1203. In step S1203, the image-quality estimating unit 103f compares the coefficient value of the sub-band 3LL of the respective regions R(,) with a threshold value TH2 (TH2>TH1) for determining a bright portion, and makes a determination as to which is larger/smaller. When the 3LL coefficient is or more the threshold value TH2, the image-quality estimating unit 103f determines that the region R(,) belongs to the luminance region 3 (bright portion) in step S1204. When TH1<3LL<TH2, the image-quality estimating unit 103f determines that the region R(,) belongs to luminance region 2 (intermediate portion) in step S1205.

As described above, the image-quality estimating unit 103f classifies each of the regions R(,) in one piece of RAW image data to be encoded as either a dark portion, an intermediate portion, or a bright portion.

The description returns to the flowchart of FIG. 11. After completing step S1101 processing, the image-quality estimating unit 103f advances the processing to step S1102.

The image-quality estimating unit 103f includes an inverse quantization processing unit, an inverse frequency transformation processing unit, and an inverse channel transforming unit (not illustrated). The image-quality estimating unit 103f uses these to compute an estimation value indicating a degree of degradation due to encoding for each of the regions classified into luminance regions 1, 2, and 3. In the embodiments, PSNR (Peak Signal to Noise Ratio) values are computed from the RAW data restored from the pre-coded RAW data and the quantized sub-band data. Here, the number of pixels included in one region in the RAW data is N, and the pixel values of the region before encoding are $y_i$ (i=0, 1, . . . , N−1). Further, if the pixel value of the restored RAW data obtained by the inverse quantization processing unit, the inverse frequency transformation processing unit, and the inverse channel transforming unit is $y'_i$, and the largest possible value of the pixel is ymax, PSNR is computed by the following Equation (5).

$$PSNR = 10\log\left(\frac{ymax^2}{\sum_{i=0}^{N}(yi-y'i)^2/N}\right) \quad (5)$$

As described above, the PSNR value is computed by using a theoretical peak value of the signal and the root mean square value of the error of the signal, and the value is expressed by a common logarithm, and its units are dB (decibel). The larger this value, the closer the encoded RAW data is to the pre-encoded RAW data, i.e., the smaller the degradation of image quality due to encoding. Therefore, this PSNR can be used as an estimation value representing the image quality of the RAW data after encoding.

The image-quality estimating unit 103f computes the PSNR of all the regions classified as luminance region 1 (dark portion), and computes the average value as an image quality estimation value PSNR1 of the luminance region 1.

The image-quality estimating unit 103f computes the PSNR of all the regions classified as luminance region 2 (intermediate portion), and computes the average value as an image quality estimation value PSNR2 of the luminance region 2.

In the image-quality estimating unit 103f, threshold values TH_PSNR1 and TH_PSNR2, which are image quality estimation references, are set in advance by the control unit 101. The values of the threshold values TH_PSNR1 and TH_PSNR2 are determined based on an image quality standard selected by the user through the operation unit 108. For example, three image quality standards such as "visually lossless", "high quality", and "normal" can be selected by the user, and threshold values TH_PSNR1 and TH_PSNR2 are determined and set from reference values statistically computed in advance according to the selected image quality standard.

Next, the image-quality estimating unit 103f obtains the computed pixel estimation values PSNR1, PSNR2 of the luminance regions 1 and 2. Image quality estimation is performed by performing comparisons in order from the regions of lower luminance.

First, the image-quality estimating unit 103f compares the estimation value PSNR1 of luminance region 1 (dark portion) with the threshold value TH_PSNR1 in step S1103, and makes a determination as to which is larger/smaller. When the estimation value PSNR1 is smaller than the threshold value TH_PSNR1, the image-quality estimating unit 103f advances the process to step S1104, and determines the image quality of encoding of the frame of interest as "low".

When the estimation value PSNR1 is equal to or greater than the threshold value TH_PSNR1, the image-quality estimating unit 103f causes the process to proceed to step S1105. In step S1105, the image-quality estimating unit 103f compares the estimation value PSNR2 of luminance region 2 (intermediate portion) with the threshold value TH_PSNR2, and makes a determination as to which is larger/smaller. When the estimation value PSNR2 is smaller than the threshold value TH_PSNR2, the image-quality estimating unit 103f advances the process to step S1106, and determines the image quality of encoding for the frame of interest as "intermediate".

When the estimation value PSNR2 is equal to or greater than the threshold value TH_PSNR2, the image-quality estimating unit 103f causes the process to proceed to step S1107. In step S1107, the image-quality estimating unit 103f determines the image quality of encoding for the frame of interest as "high".

The information indicating the image quality estimation result (one of high, medium, or low) generated by the image-quality estimating unit 103f is supplied to the control unit 101. The control unit 101 displays the result on the display unit 105 so as to be identifiable. The image quality estimation result is displayed together with the live image captured by the image capturing unit 102. That is, since both the image that is the target of the image quality estimation and the image quality estimation result are simultaneously displayed, the user can confirm the image quality of compression processing while confirming the subject by the live image. Information indicating the image quality estimation result (one of high, intermediate, or low) is displayed by a display item such as an icon. The image quality estimation results may be displayed so as to be identifiable by varying a display form such as icon color or display size, or displaying an icon corresponding to the image quality estimation results. In addition, different colors may be displayed by LEDs in accordance with the image quality estimation result.

Figure 13:
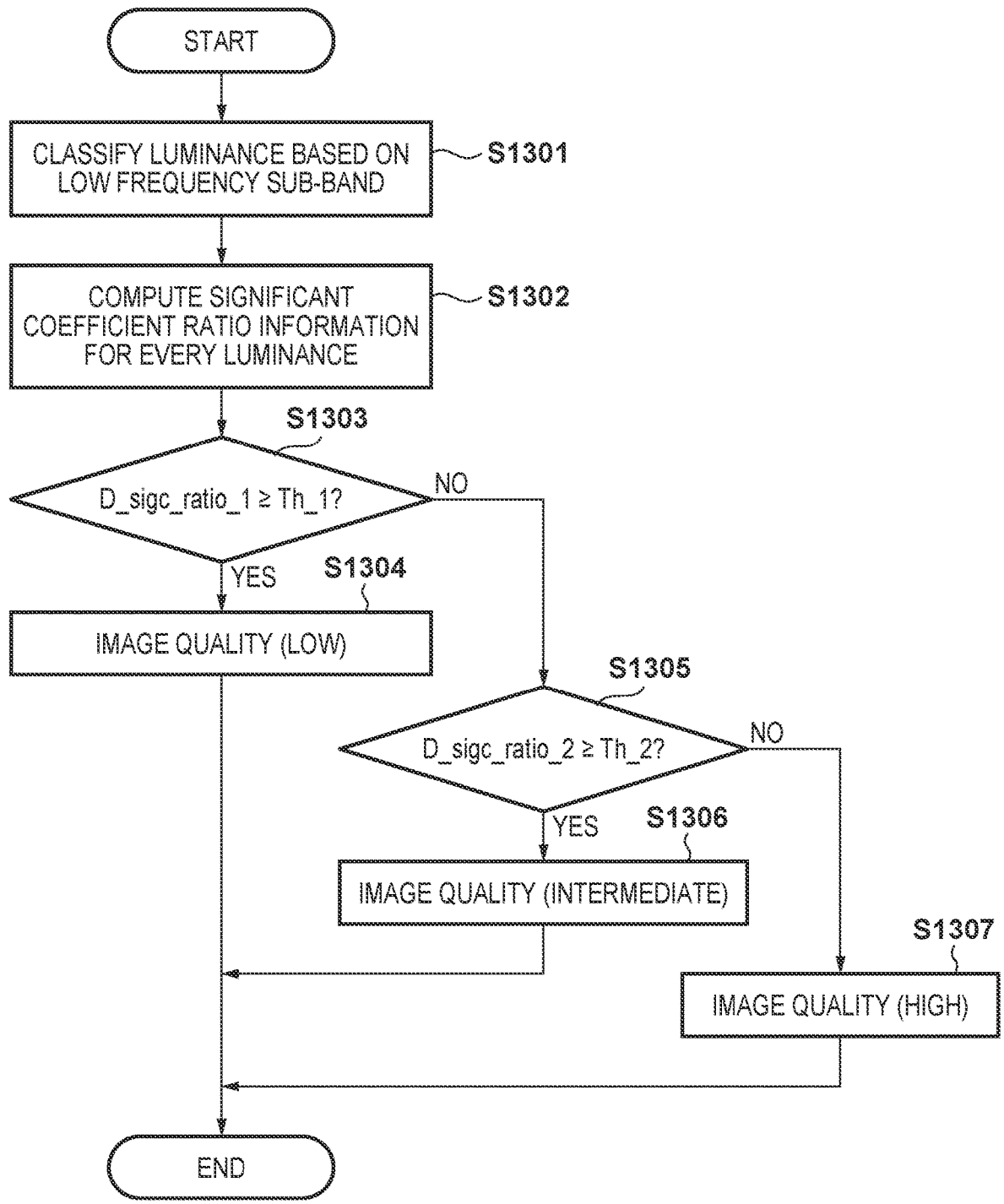
FIG. 13 is a flowchart illustrating an image quality estimation method according to a second embodiment.
Figure 14:
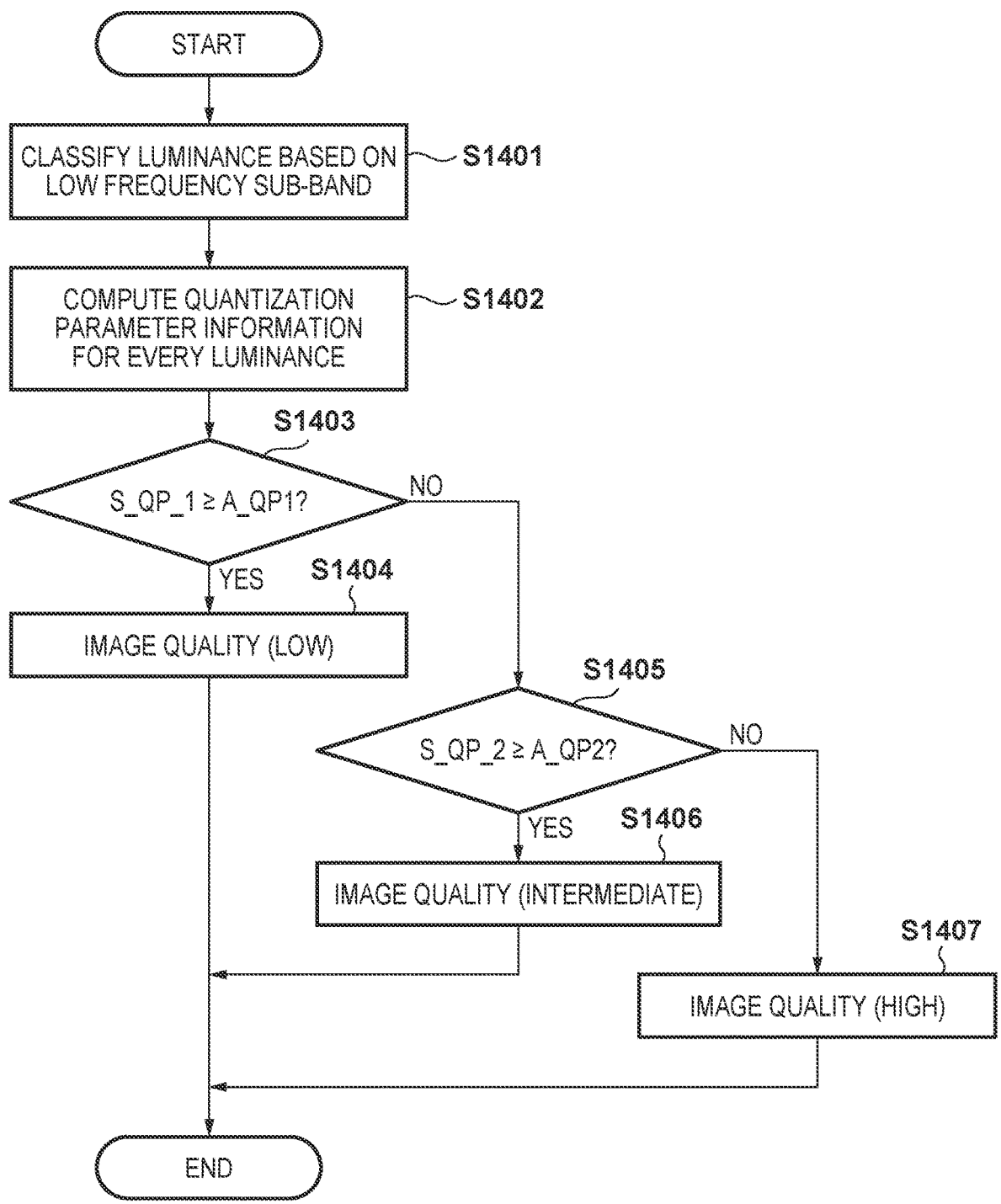
FIG. 14 is a flowchart illustrating an image quality estimation method according to a third embodiment.

As described above, by performing the image quality estimation as in FIGS. 11, 13, and 14 and displaying the image estimation result, it is possible to confirm the image quality of the current capturing scene when capturing with the current compression rate setting even before recording the RAW data. Since the image quality estimation and the image estimation result are displayed in the image capture standby state before the RAW data is recorded, the user can check in advance whether or not the current capturing scene satisfies the set image quality standard on the display unit 105 when the image capturing apparatus 100 is in the image capture standby state, and can determine whether or not RAW data can be recorded at an optimum compression rate. When the user determines that the image quality standard is sufficiently satisfied and instructs recording by the operation unit 108, the image recording processing unit 104 starts recording on the recording medium 106. Although the image quality estimation may be continued during the recording to the recording unit 108, at least, configuration is such that the above-described image quality estimation and image quality estimation result are displayed before the recording of the compressed/encoded RAW image data is started upon acceptance of an instruction to start recording from the user. Since the setting of the image quality (compression rate) is performed before the recording of the data and cannot be changed during the recording, configuration may be such that the estimation of the image quality of the compression and the display of the estimation result is performed only when standing by for image capturing before the instruction to start recording is accepted. That is, the image quality estimation and the image estimation result are not displayed during the recording of RAW data upon acceptance of an instruction to start recording. Configuration may be taken such that while the RAW data is being recorded, the image quality estimation is continuously performed, and the image estimation result is simply not displayed.

Figure 16:
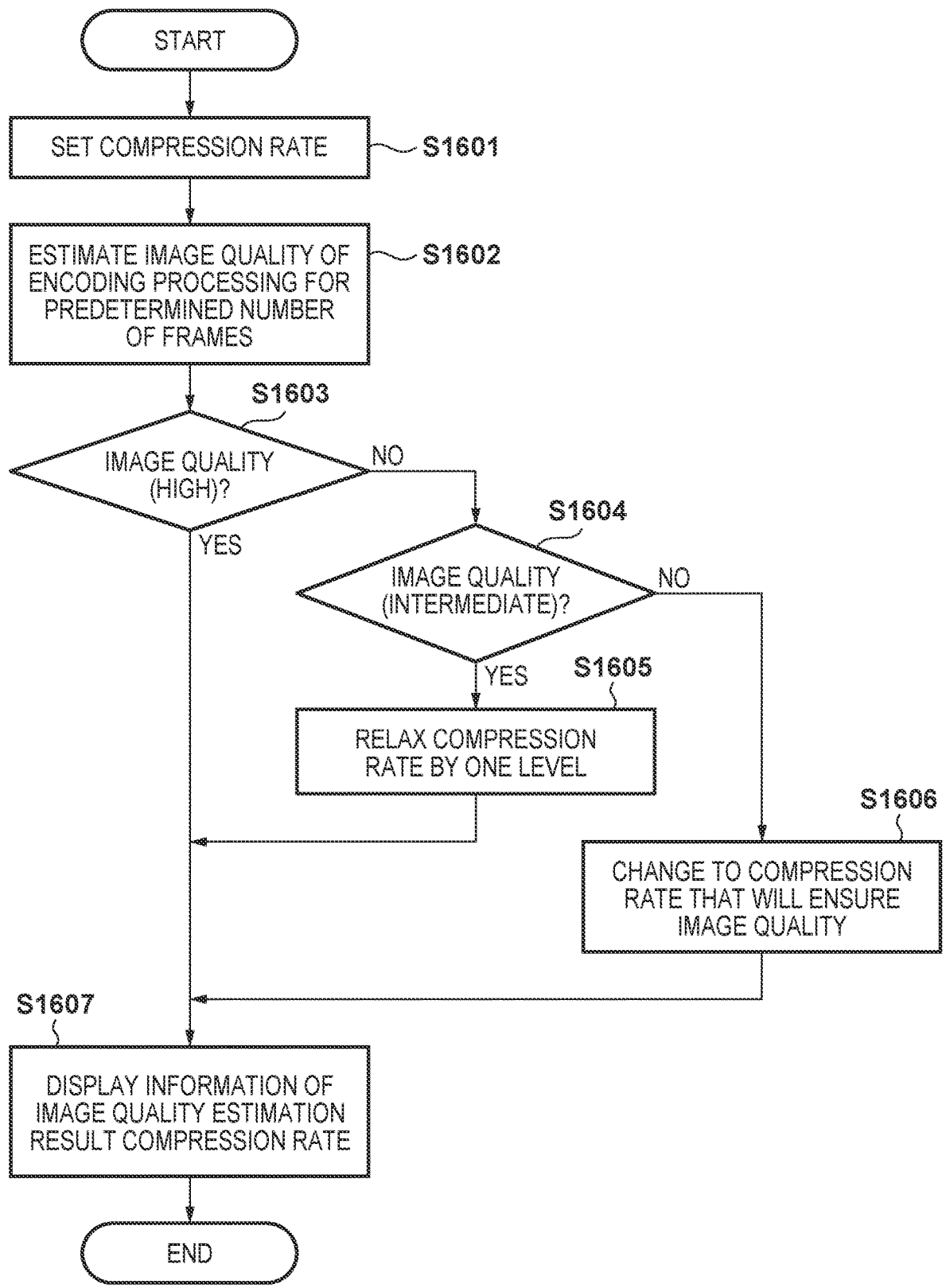
FIG. 16 is a flowchart illustrating operation in an image quality estimation mode.

Here, as an application example, description will be given, according to the flowchart illustrated in FIG. 16, of an image quality estimation mode in which image quality estimation based on encoding processing is performed for RAW data according to capturing a predetermined number of frames, assuming still image continuous shooting recording or moving image recording, but recording on the recording medium 106 is not performed. In the case of still image continuous shooting recording or moving image recording, the processing in the image quality estimation mode of the flowchart of FIG. 16 is performed, but in the case of still image single shooting recording, the image quality estimation is not executed. In addition to this application example, in the above-described embodiment, configuration may be taken such that the image quality estimation and the display of the estimated image quality information are performed when still image continuous shooting recording or moving image recording is set, and such that the image quality estimation and the display of estimated image quality information are not performed when the still image single shooting recording is set.

First, the control unit 101 sets the compression rate for when encoding the RAW data recording (step S1601). The compression rate is selected, by the user operating the operation unit 108, from a plurality of preset levels.

Next, a predetermined number of frames of RAW data are encoded, and the image quality estimation is performed by the image-quality estimating unit 103f as described above (step S1602). Incidentally, the number of frames to be encoded in conjunction with the image quality estimation may be, for example, a number of frames to be subjected to quantization control by the quantization-parameter generating unit 103c. In the estimation, an average value of the estimation based on the number of frames captured in the estimation period is obtained. For example, the average value of the number of frames included in the period of image quality estimation is obtained by digitizing the "low", "intermediate", and "high" of the foregoing estimation processing to 1, 2, and 3. Then, for example, when the average value is less than 1.5, it is set to "low", when the average value is 1.5 or more and less than 2.5, it is set to "intermediate", and when the average value is 2.5 or more, it is set to "high".

Next, the control unit 101 determines whether or not the result of the image quality estimation is "high" in step S1603. In the case of "high", since the image quality standard is satisfied, the compression rate is not changed. The control unit 101 displays that the estimation result of the present image quality and the compression rate are appropriate on the display unit 105 in step S1607, and thereby notifies the user. For example, the control unit 101 displays characters, numerical values, and the like indicating the estimation result and the compression rate in green.

Meanwhile, in the case where the image quality is not "high", the control unit 101 determines whether or not the result of the image quality estimation is "intermediate" in step S1604. If it is "intermediate", there is a possibility that the image quality standard is not satisfied, and therefore the compression rate is relaxed by one level in step S1605. Specifically, by increasing the target code amount of one frame value by a preset value, the quantization step is made to tend not to increase to a large value. The control unit 101 displays the estimation result of the present image quality and the compression rate on the display unit 105 in step S1607, and thereby notifies the user. For example, the control unit 101 displays characters, numerical values, and the like indicating the estimation result and the compression rate in yellow.

When it is determined in step S1604 that the image quality is not "intermediate" (when the image quality is "low"), there is a possibility that the image quality standard is not satisfied, and therefore, the control unit 101 changes the compression rate to a compression rate that can reliably ensure the image quality standard in step S1606. It is assumed that a compression rate capable of ensuring the image quality standard is preset to a setting value determined in advance for various scenes based on statistical image quality estimation. Also, the control unit 101 displays the estimation result of the present image quality and the compression rate on the display unit 105 in step S1607, and thereby notifies the user. For example, the control unit 101 displays characters, numerical values, and the like indicating the estimation result and the compression rate in red.

As described above, by generating an estimation value based on sub-band data before/after quantization preferentially the lower the luminance is, it becomes possible to perform an image quality estimation that considers the image quality standard after development, and it becomes possible to perform RAW data recording support at an optimum compression rate for the image quality standard required by the user.

Second Embodiment

The image capturing apparatus according to the second embodiment has a similar configuration to that of the image capturing apparatus illustrated in the foregoing first embodiment. However, the image quality estimation method of the image-quality estimating unit 103f is different. Therefore, description of common configurations is omitted, and the image quality estimation method in the image-quality estimating unit 103f, which is what is different, will be described based on the flowchart illustrated in FIG. 13.

In step S1301, the image-quality estimating unit 103f classifies a luminance region of a block of interest based on the low frequency sub-band 3LL among the sub-bands supplied from the frequency transforming unit 103b for the region R(,). The luminance region classifying method is the same as that of the first embodiment (FIG. 12).

Next, in step S1302, for each luminance region, the image-quality estimating unit 103f counts the significant coefficients of the pre-quantized sub-band data generated by the frequency transforming unit 103b and the post-quantized sub-band data generated by the quantizing unit 103d, that is, the coefficients whose values are non-zero. Then, the image-quality estimating unit 103f generates significant coefficient ratio information before/after quantization, and obtains an index value indicating the degree of image quality degradation for each luminance region based on the ratio information. A specific example will be described below.

The image-quality estimating unit 103f computes ratio information sigc_sb_ratio for the number of significant coefficients with respect to the number of coefficients for each sub-band before quantization for each luminance region. The ratio information sigc_sb_ratio is as illustrated in the following Equation (6).

$$\text{sigc\_ratio} = \sum_{sb=0}^{N} (\text{sic\_sb\_ratio}[sb] \times w[sb]) \quad (6)$$

Here, sb represents a sub-band index, and is any one of 0 to 9 in the case of the embodiment. In addition, w is preset and is a weighting coefficient.

From FIG. 9B, the sub-band index "0" indicates the sub-band "3LL". Therefore, sigc_sb_ratio(0) represents a ratio in which the number of coefficients included in the sub-band "3LL" is the denominator and the number of non-zero coefficients is the numerator. In addition, a value corresponding to the quantization method may be set as the weighting coefficient to be multiplied for each sub-band, for example, the weighting coefficient may be determined according to the importance of the sub-band, or when only a specific sub-band is compared, a zero coefficient may be used to mask the significant coefficient ratio information of the non-target sub-band.

The image-quality estimating unit 103f computes sigc_ratio_1A as the ratio information of luminance region 1 before quantization and sigc_ratio_2A as the ratio information of luminance region 2 before quantization according to Equation (6).

Also, the image-quality estimating unit 103f computes sigc_ratio_1B as the ratio information of luminance region 1 after quantization and sigc_ratio_2B as the ratio information of luminance region 2 after quantization according to Equation (6).

Then, the image-quality estimating unit 103f computes a value obtained by subtracting the ratio information sigc_ratio_1B after quantization from the ratio information sigc_ratio_1A before quantization as the final image quality estimation value D_sigc_ratio_1 of the luminance region 1.

$$D\_sigc\_ratio\_1 = sigc\_ratio\_1A - sigc\_ratio\_1B$$

As is clear from the above description, the smaller the image quality estimation value D_sigc_ratio_1, the closer the quantized sub-band data is to the sub-band data before quantization, that is, the smaller the degradation.

Similarly, the image-quality estimating unit 103f computes a value obtained by subtracting the ratio information sigc_ratio_2B after quantization from the ratio information sigc_ratio_2A before quantization as the image quality estimation value D_sigc_ratio_2 of the luminance region 2.

When the computation of the image quality estimation values D_sigc_ratio_1 and D_sigc_ratio_2 is completed as described above, the image-quality estimating unit 103f advances the process to step S1303.

In step S1303, the image-quality estimating unit 103f compares the image quality estimation value D_sigc_ratio_1 of the luminance region 1 with the threshold value Th_1 for the luminance region 1.

When D_sigc_ratio_1≥Th_1, the image-quality estimating unit 103f advances the process to step S1304, and determines the image quality of encoding of the frame of interest as "low".

When D_sigc_ratio_1<Th_1, the image-quality estimating unit 103f advances the process to step S1305. In step S1305, the image-quality estimating unit 103f compares the image quality estimation value D_sigc_ratio_2 of the luminance region 2 with the threshold value Th_2 for the luminance region 2, and makes a determination as to which is larger/smaller.

When D_sigc_ratio_2≥Th_2, the image-quality estimating unit 103f advances the process to step S1306, and determines the image quality of encoding of the frame of interest as "intermediate".

When D_sigc_ratio_2<Th_2, the image-quality estimating unit 103f advances the process to step S1307, and determines the image quality of encoding of the frame of interest as "high".

In this manner, the image-quality estimating unit 103f notifies the control unit 101 of the image quality estimation result. The control unit 101 displays the image quality estimation result on the display unit 105 so as to be identifiable.

As described above, by generating an estimation value based on sub-band data before/after quantization for each luminance region, it becomes possible to perform an image quality estimation that considers the image quality standard after development, and it becomes possible to perform the RAW data recording support at an optimum compression rate for the image quality standard required by the user.

In the above second embodiment, a ratio whose the denominator is the number of coefficients included in the sub-band to and whose numerator is the number of non-zero coefficients is obtained, but since the number of the transform coefficients included in the denominator is the same before/after quantization, the difference between the non-zero transform coefficients before/after quantization for each sub-band may be obtained.

Third Embodiment

The image capturing apparatus according to the third embodiment has a similar configuration to that of the image capturing apparatus illustrated in the foregoing first embodiment. The image quality estimation method of the image-quality estimating unit 103f is different. Therefore, description of common configurations is omitted, and the image quality estimation method in the image-quality estimating unit 103f, which is what is different, will be described based on the flowchart illustrated in FIG. 14.

The image-quality estimating unit 103f, in step S1401, classifies a region (corresponding to 16×16 pixels in the RAW data in the embodiment) indicated by the sub-band among the sub-bands supplied from the frequency transforming unit 103b into one of luminance region 1 (dark portion), luminance region 2 (intermediate portion), and luminance region 3 (bright portion) based on the low frequency sub-band. Since the method of classifying the luminance region is similar, a detailed description thereof will be omitted.

Next, in step S1402, the image-quality estimating unit 103f computes an average value of quantization parameters (hereinafter referred to as A_QP) for each luminance region used in the quantization process by the quantizing unit 103d as the estimation value indicating the degree of degradation due to encoding. Here, the average value of the quantization parameter of the luminance region 1 is assumed to be A_QP1, and the average value of the quantization parameter of the luminance region 2 is assumed to be A_QP2. Here, it is assumed that for a quantization parameter generated by the quantization-parameter generating unit 103c, luminance regions are classified using the luminance region classification method illustrated in the flowchart of FIG. 12, similarly to the image-quality estimating unit 103f, and generation of a quantization parameter related to the image quality control for adjusting the intensity of quantization is performed for each of the luminance regions.

Figure 15:
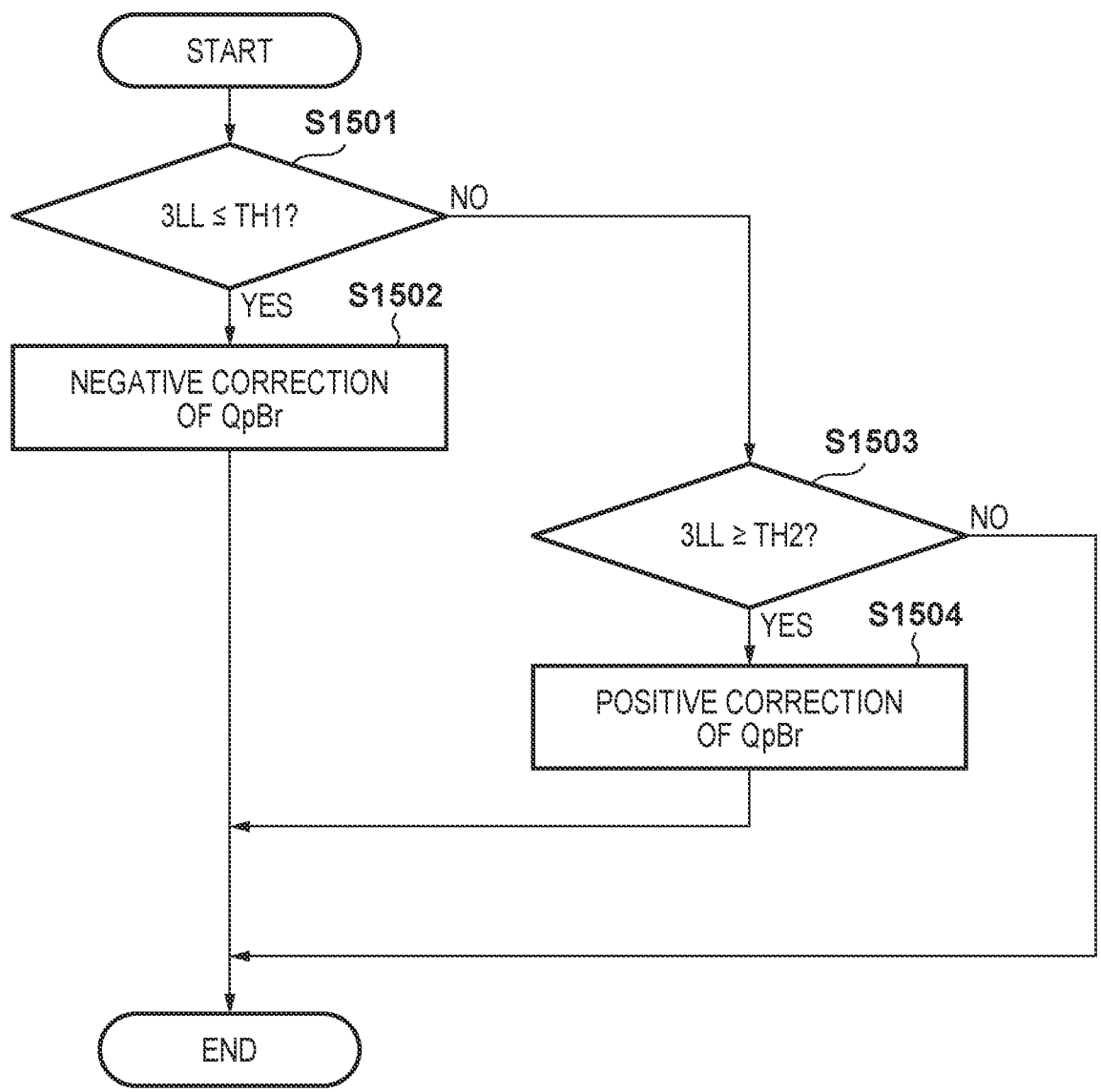
FIG. 15 is a flowchart illustrating a method of controlling quantization for each luminance region.

For example, as illustrated in the flowchart of FIG. 15, when sub-band division is performed with lev=3, the quantization-parameter generating unit 103c determines whether or not the 3LL sub-band data value among the sub-band data supplied from the frequency transforming unit 103b is equal to or smaller than the threshold value TH1 (step S1501). If the value is equal to or less than the threshold value TH1, it is determined as a dark portion, and negative correction is performed on the QpBr by a predetermined value (step S1502). If the value is larger than the threshold value TH1, it is determined whether or not the value is ≥ the threshold value TH2 (step S1503). If the value is equal to or greater than the threshold value TH2, it is determined as a bright portion, and positive correction is performed on the QpBr by a predetermined value (step S1504). If the value is smaller than the threshold value TH2, it is determined as an intermediate portion, and the QpBr is not corrected. It is assumed that the larger the value of the quantization parameter, the coarser the quantization.

The QpBr fluctuates within the screen due to code amount control, and the quantization parameters for each luminance region generated by the image quality control fluctuate accordingly.

Here, in the image-quality estimating unit 103f, threshold values (hereinafter referred to as S_QP) of a reference for a quantization parameter serving as an image quality estimation reference is set in advance by the control unit 101, and the reference value is determined based on the image quality standard selected by the user. Here, the threshold value for the luminance region 1 is S_QP1, and the threshold value for the luminance region 2 is S_QP2.

Subsequently, the image-quality estimating unit 103f performs image quality estimation by comparing the A_QP generated as described above and the S_QPs serving as the reference values in order from the region having the lower luminance.

First, in step S1403, the image-quality estimating unit 103f compares the estimation value A_QP1 of luminance region 1 with the threshold value S_QP1, and makes a determination as to which is larger/smaller.

When A_QP1≥S_QP1, since the image quality is lower than the specified image quality standard, the image-quality estimating unit 103f advances the process to step S1404 and determines that the image quality is "low".

When A_QP1<S_QP1, the image-quality estimating unit 103f advances the process to step S1405. In step S1405, the image-quality estimating unit 103f compares the estimation value A_QP2 of luminance region 2 with the threshold value S_QP2, and makes a determination as to which is larger/smaller.

When A_QP2≥S_QP2, since the image quality is lower than the specified image quality standard, the image-quality estimating unit 103f advances the process to step S1406 and determines that the image quality is "intermediate".

When A_QP2<S_QP2, since the specified image quality standard is satisfied, the image-quality estimating unit 103f advances the process to step S1407 and determines that the image quality is "high".

In this manner, the image-quality estimating unit 103f notifies the control unit 101 of the image quality estimation result. The control unit 101 displays the contents of the notification on the display unit 105 to notify the user.

As described above, by generating the estimation value based on the quantization parameter information for each luminance region, it becomes possible to perform image quality estimation in consideration of the image quality standard after development, and it becomes possible to perform RAW data recording support at an optimum compression rate with respect to the image quality standard required by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-234707, filed Dec. 14, 2018, which is hereby incorporated by reference herein in its entirety.

What is claimed is:

1. An image capturing apparatus having an image capturing unit, a transforming unit configured to transform RAW image data obtained by the image capturing unit into a plurality of channels, and an encoding unit configured to perform a frequency transformation, quantization, and encoding for each channel, the image capturing apparatus comprising:
    a classifying unit configured to, based on a sub-band of a low-frequency component obtained by the frequency transformation for a channel, in which a luminance component is predominant, obtained by the transforming unit, classify a luminance of each region in a case where one screen is divided into a plurality of regions;
    an estimation unit configured to, for each luminance, compute an index value representing a degree of difference between data before/after the quantization for each region, and estimate an image quality based on the index value; and
    a display control unit configured to display on a display unit an estimation result by the estimation unit.

2. The apparatus according to claim 1, wherein the display control unit controls to display on the display unit the estimation result by the estimation unit together with an image obtained by the image capturing unit, and displays display items of different display forms in accordance with the image quality of the estimation result.

3. The apparatus according to claim 1, further comprising the display unit.

4. The apparatus according to claim 1, wherein the estimation unit estimates an image quality by giving preference to an index value having a lower luminance among the index values for each luminance.

5. The apparatus according to claim 1, further comprising:
    a recording control unit configured to, in order to record in a recording unit RAW data encoded by the encoding unit at a set compression rate in relation to RAW image data obtained by the image capturing unit, output RAW data to the recording unit, wherein while RAW data is being recorded in the recording unit, the display control unit does not display the estimation result by the estimation unit or does not perform the estimation by the estimation unit.

6. The apparatus according to claim 1,
wherein the estimation unit estimates the image quality at a time of continuous shooting of a still image or at a time of capturing of a moving image, and does not estimate the image quality at a time of single shooting of a still image.

7. The apparatus according to claim 1, wherein the classifying unit, using threshold values set in advance, classifies the regions into at least three regions: a dark portion, a bright portion, and an intermediate portion which indicates an intermediary portion therebetween.

8. The apparatus according to claim 1,
wherein the frequency transform is a discrete wavelet transform.

9. The apparatus according to claim 1,
wherein the estimation unit derives, as the index value of the luminance, a PSNR value based on the RAW image data obtained by decoding the RAW image data before quantization.

10. The apparatus according to claim 8,
wherein the estimation unit derives as the index value a difference between a number of non-zero transform coefficients in a sub-band before quantization and the number of non-zero transform coefficients in the sub-band after quantization.

11. The apparatus according to claim 8,
wherein the estimation unit derives, as the index value, a quantization parameter corrected for each luminance with respect to a quantization parameter for a time of quantization.

12. The apparatus according to claim 1,
wherein the RAW image data is image data of a Bayer array,
wherein the transforming unit transforms the RAW image data into an R channel composed only of an R component, a B channel composed only of a B component, a G1 channel composed only of a G1 component, and a G2 channel composed only of a G2 component,
wherein the classifying unit classifies the luminance based on image data of the G1 channel or image data of the G2 channel.

13. The apparatus according to claim 1,
wherein the RAW image data is image data of a Bayer array,
wherein of the transforming unit transforms the RAW image data into a channel corresponding to brightness and a plurality of channels corresponding to color difference,
wherein the classifying unit classifies the luminance based on data of the channel corresponding to brightness.

14. The apparatus according to claim 1, further comprising a setting unit configured to, in accordance with an operation by a user, set a target code amount for one frame to be encoded by the encoding unit.

15. A control method of an image capturing apparatus having an image capturing unit, a transforming unit configured to transform RAW image data obtained by the image capturing unit into a plurality of channels, and an encoding unit configured to perform a frequency transformation, quantization, and encoding for each channel, the method comprising:
based on a sub-band of a low-frequency component obtained by the frequency transformation for a channel, in which a luminance component is predominant, obtained by the transforming unit, classifying a luminance of each region in a case where one screen is divided into a plurality of regions;
computing, for each luminance, an index value representing a degree of difference between data before/after the quantization for each region;
estimating an image quality based on the index value; and
displaying on a display unit an estimation result in the estimating.

16. A non-transitory computer-readable storage medium storing a program which causes a computer having an image capturing unit, a transforming unit configured to transform RAW image data obtained by the image capturing unit into a plurality of channels, and an encoding unit configured to perform a frequency transformation, quantization, and encoding for each channel, to execute to
classify, based on a sub-band of a low-frequency component obtained by the frequency transformation for a channel, in which a luminance component is predominant, obtained by the transforming unit, a luminance of each region in a case where one screen is divided into a plurality of regions;
compute, for each luminance, an index value representing a degree of difference between data before/after the quantization for each region;
estimate an image quality based on the index value; and
displaying on a display unit an estimation result in the estimating.

17. An image capturing apparatus having an image capturing unit, a transforming unit configured to transform RAW image data obtained by the image capturing unit into a plurality of channels, and an encoding unit configured to perform a frequency transformation, quantization, and encoding for each channel, the image capturing apparatus comprising:
a classifying unit configured to, based on a sub-band of a low-frequency component obtained by the frequency transformation for a channel, in which a luminance component is predominant, obtained by the transforming unit, classify a luminance of each region in a case where one screen is divided into a plurality of regions; and
an estimation unit configured to, for each luminance, compute an index value representing a degree of difference between data before/after the quantization for each region, and estimate an image quality based on the index value,
wherein the estimation unit estimates an image quality by giving preference to an index value having a lower luminance among the index values for each luminance.

18. An image capturing apparatus having an image capturing unit, a transforming unit configured to transform RAW image data obtained by the image capturing unit into a plurality of channels, and an encoding unit configured to perform a frequency transformation, quantization, and encoding for each channel, the image capturing apparatus comprising:
a classifying unit configured to, based on a sub-band of a low-frequency component obtained by the frequency transformation for a channel, in which a luminance component is predominant, obtained by the transforming unit, classify a luminance of each region in a case where one screen is divided into a plurality of regions; and
an estimation unit configured to, for each luminance, compute an index value representing a degree of difference between data before/after the quantization for each region, and estimate an image quality based on the index value, wherein the estimation unit derives, as the index value of the luminance, a PSNR value based on the RAW image data obtained by decoding the RAW image data before quantization.

\* \* \* \* \*